INVENTORS.
DAVID W. LEYSHON
WILLIAM A. LUTZ
ROBERT H. OLIVER
HANS H. OLTMANN

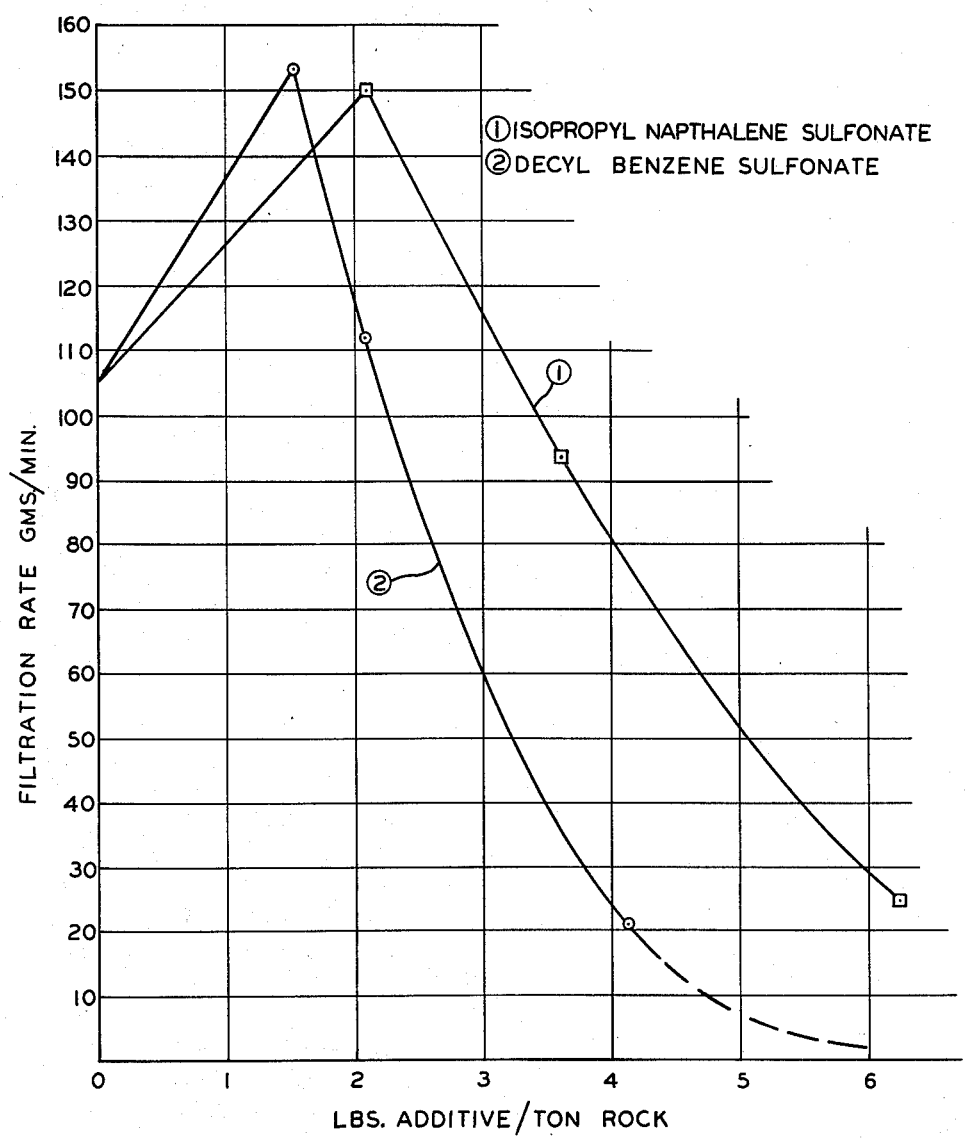

3,192,014
MANUFACTURE OF PHOSPHORIC ACID
David W. Leyshon, Westport, William A. Lutz, Weston,
Robert H. Oliver, Fairfield, and Hans H. Oltmann,
Westport, Conn., assignors to Dorr-Oliver Incorporated,
Stamford, Conn., a corporation of Delaware
Filed Apr. 20, 1962, Ser. No. 189,206
Claims priority, application Great Britain, Apr. 26, 1961,
15,039/61
3 Claims. (Cl. 23—165)

This invention relates to improvements in the process of manufacturing phosphoric acid by the "wet process" method and more particularly to a method of manufacturing phosphoric acid so as to improve the filterability of the reaction product gypsum from the reaction product phosphoric acid.

The "wet process" method of producing phosphoric acid consists in reacting phosphate rock (calcium phosphate) with sulphuric acid in an environment containing reaction product phosphoric acid and the reaction product gypsum in accordance with the general chemical equation:

$$3H_2SO_4 + Ca_3(PO_4)_2 + 6H_2O \rightarrow 2H_3PO_4 + 3CaSO_4 \cdot 2H_2O$$

In order that the phosphoric acid may be used in subsequent reactions, such for example, as in the manufacture of triple superphosphate, it is necessary to remove the gypsum from the acid. This may be done in a number of ways, the most common of which is by filtration. The ease with which the gypsum can be removed from the phosphoric acid depends almost entirely upon the physical conditions of the gypsum, that is, the size and shape of the gypsum crystals.

It is well known that with certain types of phosphate rocks, for example, rocks from South Africa and from western North America, which are more refractory (i.e., in the nature of dense crystalline apatite) than phosphate rock obtained from Florida and Morocco, when reacted in the above described process produce a gypsum slurry which is very difficult to filter and in some instances cannot, economically, be filtered at all.

Some of the filtration difficulties encountered include low filtration efficiency, therefore requiring much larger filtration surfaces for a given size plant and inefficient separation of the phosphoric acid from the gypsum whereby a relatively large fraction of the phosphoric acid product remains entrapped in the gypsum cake.

While applicants do not wish to be limited to the following explanation, it is believed that these difficulties are attributed to the shape of the gypsum crystals which are formed when these refractory rocks are used. When observed under the microscope, these crystals appeared as having elongated needle-like shapes with an approximate length to width ratio of 20:1. On the other hand, when Morocco rock was used in the aforesaid process, the crystals appeared more hexagonal in shape with a length to width ratio of about 2 or 3 to 1.

Because of these difficulties, these rocks have heretofore been considered commercially undesirable for use in the production of phosphoric acid by the aforesaid method and while many attempts have been made to overcome these difficulties and to improve the efficiency of the gypsum filtering operation, none of these attempts have met with more than a bare minimum of success.

It has also been found that with certain types of rocks which are naturally reactive and normally do not exhibit the aforesaid difficulties, when calcined to beneficiate the ore, such, for example, by the removal of troublesome organics, or when used in the unground state, also display these difficulties.

It is, therefore, an object of this invention to provide an improved process for producing phosphoric acid wherein the gypsum crystals produced can be readily filtered from the phosphoric acid.

It is another object of this invention to produce gypsum crystals which can be easily washed with a minimum of loss of soluble $P_2O_5$.

It is a further object of this invention to obtain maximum extraction of $P_2O_5$ from the phosphate rock.

It is still another object of this invention to utilize "refractory" rocks for the commercial production of phosphoric acid.

It is still another object of this invention to use unground or calcined rock for the commercial production of phosphoric acid.

These and still further objects, advantages and novel features of the present invention will become evident in the specification and claims, taken with the accompanying illustrations and graph in which:

FIGURE 3 is a plot of experimental data showing the effect of our improved process on the filtration rate of normally difficult to filter gypsum slurries.

Figure 1:
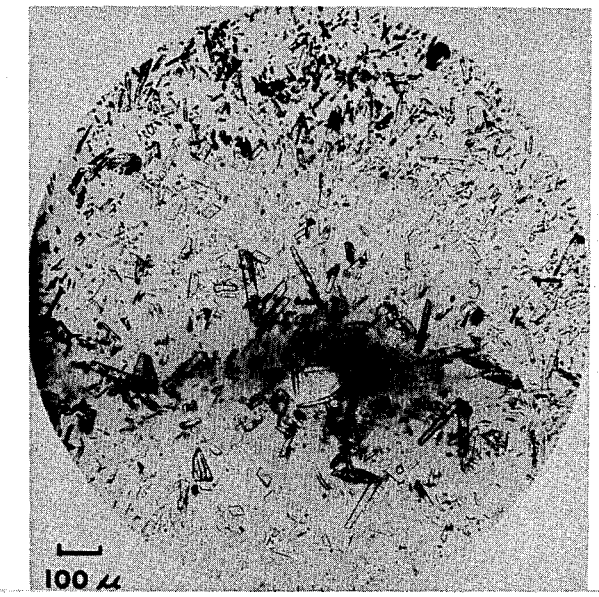
FIGURE 1 is a photomicrograph of the gypsum crystals produced when South African rock is reacted with sulphuric acid in accordance with the aforesaid reaction.

We have found that a substantial increase in the filtration rate of these normally difficult to filter gypsum slurries can be attained if the above described reaction is carried out in the presence of a small amount of an additive of the alkyl aryl sulphonic acid type and preferably the alkali metal salts of said acid.

Thus, the preferred sulphonates are the sodium alkyl benzene sulphonate having an alkyl group of about 9 to 12 carbon atoms particularly the sodium decyl benzene sulphonates.

This unexpected result of faster filtration is probably due to the change in crystal structure which occurs when these refractory rock are reacted according to our improved process and wherein the gypsum crystals formed from these rocks more closely approximate the gypsum crystals formed when Florida or Morocco rocks are used.

Many theories have been advanced to explain the chemical reaction by which the desired gypsum crystals are formed and while it is not certain what actually occurs, one explanation is that the addition of these additives promotes the formation of many nuclei which grow in a direction opposite to the growing of elongated crystals from existing nuclei thereby resulting in crystals which have a smaller width to length ratio and more of a hexagonal shape.

In any event, it appears that the improved process of our invention results from the presence in the reaction mixture at a time when the reaction is in progress and the gypsum crystals start to form of a small amount of one of the aforesaid additives and that the addition of these additives after the gypsum crystals have been formed is ineffective.

In addition, it has been further determined that the amount of additive required to improve the filterability characteristics of the gypsum falls within a specific critical range and that when an overdose of the additive is used the filtration rate can be worse than if no additive is used at all.

Thus, while the critical range required to obtain the desired results will vary with the type of phosphate rock used and the additive employed, it has been determined that there is a low limit at which no beneficial results are achieved, an optimum range where the filtration rate is at its maximum, an upper limit where again there will be no improvement in the filtration rate and an amount beyond this upper limit where the addition of the additive is definitely harmful to the filtration rate.

Such harmful effects may include the production of foam or froth which carries phosphoric acid to overflow out of the reaction equipment or into the fume and the vacuum system. Also, excessive amounts of these additives may cause dispersion of any slimes or fine gypsum present thereby permitting the passage of the slimes or fines through the filter into the product phosphoric acid.

We have also found that the addition of these additives are effective when unground or calcined rocks are used. In both of these cases (i.e., use of unground or calcined rock), the rate of digestion of phosphate rock is slower than where ground uncalcined rock is used. Coarse rock tends to coat with precipitated gypsum leaving a core of unreacted rock and making stoichiometric control of sulphuric acid addition difficult. Calcination tends in most instances to glaze or densify the phosphate rock making it more susceptible to gypsum coating and poor reaction control. The use of these additives materially aids in improving the digestion properties and gypsum formed from these rocks.

This invention will be better understood from a consideration of the following examples which, however, is not limited thereto:

*Example I*

A series of batch digestion tests using varying amounts of additives were performed to determined the optimum concentration of two additives, namely, decyl benzene sulphonate and iso-propyl naphthalene sulphonate. The procedure was as follows:

A dense phosphate rock from Leefe, Wyoming, was ground to a degree of fineness so that 90% passed through a 200 mesh screen. Over a period of two hours 500 grams of the ground rock and 390 ccs. of 96% sulphuric acid was introduced into a flask containing 500 ccs. of 28% $P_2O_5$ phosphoric acid preheated to 75°.

During the two hours the phosphate slurry was agitated and the temperature maintained at 75° C. by a hot plate. Sufficient water was periodically added to the reaction slurry in order to maintain the acid strength in the range of 25–32% $P_2O_5$. At the end of the two hours the slurry was filtered on a test leaf using polyethylene 2202 cloth and the form time of the pulp was noted. (This is the time required for the liquid to disappear from the surface of the cake.) The cake was washed, dried, and the gypsum weighed.

Gypsum filter rates were then calculated as grams of dry gypsum per minute (of form time) and plotted on graphs. See FIGURE 3.

From the curve it will be seen that when using western North American rock the optimum concentration for decyl benzene sulphonate is approximately 1.5 lbs. of additive per ton of rock, whereas for iso-propyl naphthalene sulphonate the optimum concentration is approximately 2.1 lbs. of additive per ton of rock. However, it will be noted that improved filtration results were obtained at much lower concentration it being determined that for decyl benzene sulphonate the lower limit of effectiveness was a concentration of about 0.1 lb. of additive per ton of rock and the upper limit of effectiveness was a concentration of about 2.0 lbs. of additive per ton of rock, whereas for the iso-propyl naphthalene sulphonate the lower limit of effectiveness was a concentration of about 0.1 lb. of additive per ton of rock and the upper limit of effectiveness was a concentration of about 3.2 lbs. of additive per ton of rock.

*Example II*

A dense apatitic phosphate rock from South Africa was ground to a degree of fineness so that 90% passed through a 200-mesh screen and then fed to a continuous phosphoric acid pilot plant with the object of producing 30% $P_2O_5$ acid. After 32 hours of operation (starting with a previously produced gypsum and acid slurry to provide a medium for the reaction) the pilot plant became virtually inoperable due to the formation of long thin needle-shaped crystals of gypsum which filtered at the rate of 1.0 ton per sq. ft. of filtration area per 24 hours with a filter cake of 65% solids. See FIG. 1.

Figure 2:
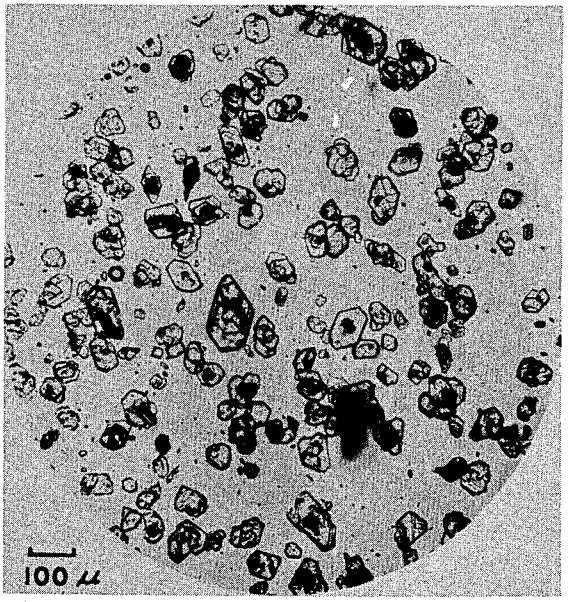
FIGURE 2 is a photomicrograph of the gypsum crystals produced when South African rock is reacted with sulphuric acid in accordance with the novel process of this invention.

At this point decyl benzene sulphonate containing 90% active material was added to the reaction magma at the rate of 0.5 lb. per ton of rock and resulted in substantially improved operation. The filtration rate increased to 2.5 to 3.0 tons of gypsum per sq. ft. per 24 hrs. and the filter cake was 80% solids. This change was accomplished in about 18 hrs. corresponding to slightly over two displacements of the pulp. A photomicrograph of the gypsum crystals after the addition of the additive is shown in FIG. 2.

*Example III*

A continuous pilot plant using unground calcined phosphate concentrate from the Negev in Israel (reactive rock), essentially −28+200 mesh, was operated without the use of our additives, for a period of 58 hours and resulted in difficult operation. Filter capacity dwindled to about 1.5 tons of gypsum per sq. ft. per day as a result of the inability to control the reaction. It was noticed that the coarse rock tended to coat with gypsum causing wide unpredictable swings in the quantity of free sulphuric acid present in the liquid phase. Operation was within the desired range of 1.25%–2.25% free sulphuric acid only 45% of the time. After the addition of 0.5 lb. of sodium decyl benzene sulphonate per ton of rock fed, the sulphuric acid was within the 1.25%–2.25% range over 70% of the 54-hour test period. 18 hours after commencing the use of the additive, filter capacities had climbed to 3.5 tons of gypsum per sq. ft. per 24 hours. In addition, as a result of improved control the insoluble losses in the gypsum went from a range of 4% to 5% of the $P_2O_5$ fed down to a range of 2.25%–2.35%.

Other advantages, besides improved filtration, achieved by the improved process of our invention are:

Lower cake moisture and complete elimination of cake cracks. The gypsum cakes obtained were 80–85% solids as compared to 75–78% solids from conventional good gypsum (from Florida and Morocco rock).

Lower washing losses. Water soluble losses from Florida and Morocco rock are about 1.5%–2.0% of the $P_2O_5$ fed in the commercial operation. Based on laboratory results, a reduction of 0.5%–1.0% is expected by the use of our additive.

By the use of these additives, rock attack is speeded up and therefore the detention time required for complete digestion is reduced.

From the foregoing description, it is evident that the objects of this invention, together with many practical advantages, are successfully achieved. While the preferred embodiment of our invention has been described numerous further modifications may be made without departing from the scope of this invention.

Therefore, it is to be understood that all matters herein set forth as shown in the accompanying drawings are to be interpreted as illustrative and not in a limiting sense.

We claim:

1. In a process for the manufacture of phosphoric acid which comprises reacting sulfuric acid with phosphate rock so as to form a reaction slurry of gypsum and aqueous phosphoric acid, and separating said aqueous phosphoric acid from said gypsum by filtration, the improvement which comprises supplying to the reaction slurry at least while said reaction is in progress and while gypsum crystals are being formed a filterability improving additive selected from the group consisting of alkyl benzene sulphonic acids, having an alkyl group from nine to twelve carbon atoms, isopropyl naphthalene sulphonic acid and the alkali metal salts of said acids in a proportion ranging from about 0.1 to 2.0 pounds of said alkyl benzene sulphonic acid per ton of phosphate rock and about 0.1 to 3.2 pounds of said isopropyl naphthalene sulfonic acid per ton of phosphate rock.

2. Process for the manufacture of phosphoric acid which comprises reacting sulfuric acid with an unground calcined phosphate rock to form a reaction slurry of gypsum and aqueous phosphoric acid, supplying to the reaction slurry at least while said reaction is in progress and while gypsum crystals are being formed a filterability improving additive selected from the group consisting of alkyl benzene sulphonic acids, having an alkyl group from nine to twelve carbon atoms, isopropyl naphthalene sulphonic acid and the alkali metals salts of said acids in a proportion ranging from about 0.1 to 2.0 pounds of said alkyl benzene sulphonic acids per ton of phosphate rock and about 0.1 to 3.2 pounds of said isopropyl naphthalene sulphonic acid per ton of rock and filtering said reaction slurry to separate the thus formed gypsum from said aqueous phosphoric acid.

3. Process according to claim 1, wherein the additive is a sodium salt of said acid.

References Cited by the Examiner
UNITED STATES PATENTS

| | | | |
|---|---|---|---|
| Re. 19,045 | 1/34 | Larsson | 23—165 |
| 2,044,942 | 6/36 | Heckert | 23—122 |
| 2,802,728 | 8/57 | Jaquier | 71—40 |
| 2,844,455 | 7/58 | Harris | 71—40 |
| 2,929,777 | 3/60 | Clevenger | 23—165 |

MAURICE A. BRINDISI, *Primary Examiner.*